No. 631,921. Patented Aug. 29, 1899.
J. W. BARTLETT.
DOUBLE CHECK ROW COTTON AND CORN PLANTER.
(Application filed Mar. 9, 1898.)
(No Model.) 3 Sheets—Sheet 1.
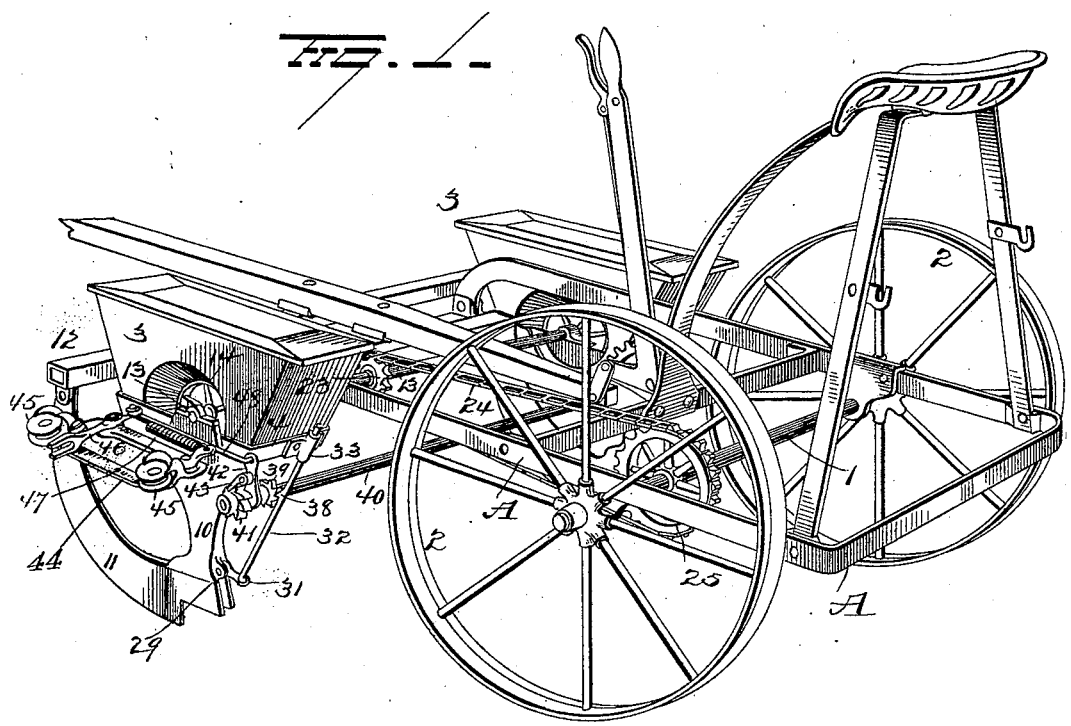
Fig. 1.
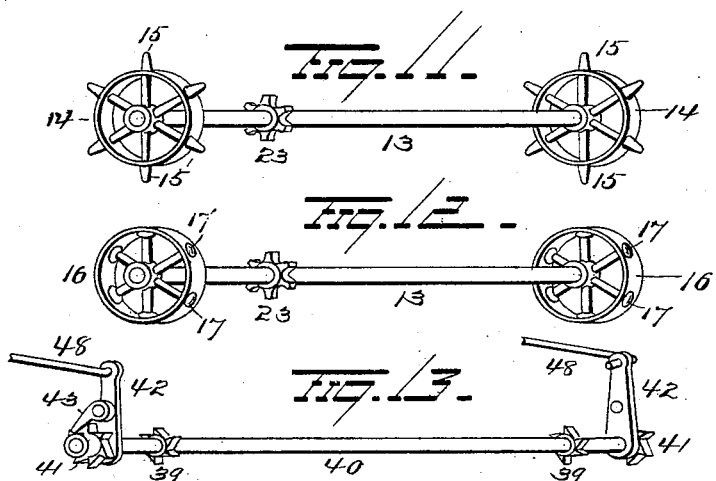
Fig. 11.
Fig. 12.
Fig. 13.
WITNESSES
E. J. Nottingham
G. F. Downing
INVENTOR
J. W. Bartlett
By H. A. Seymour
Attorney
THE NORRIS PETERS CO., PHOTO-LITHO., WASHINGTON, D. C.

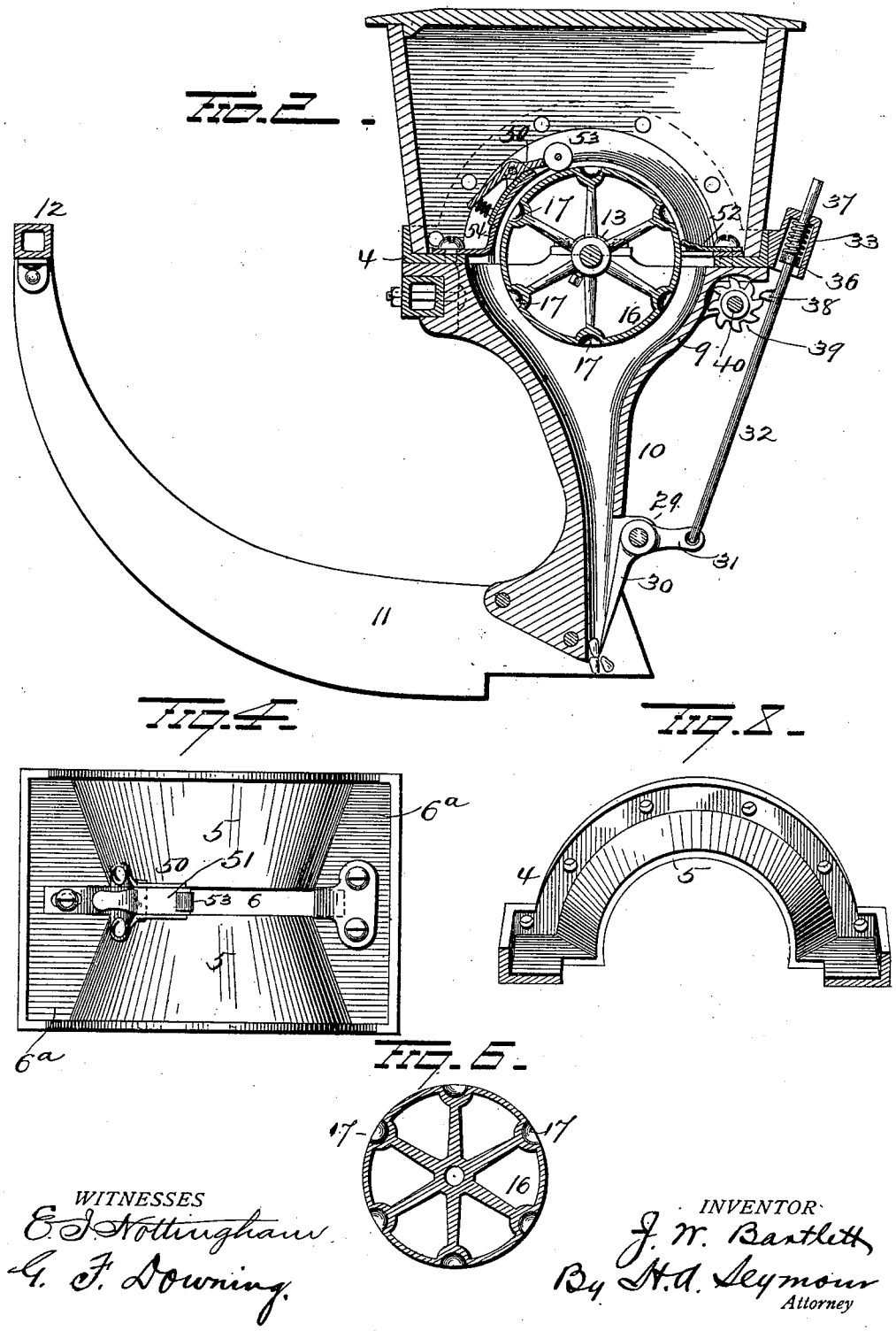

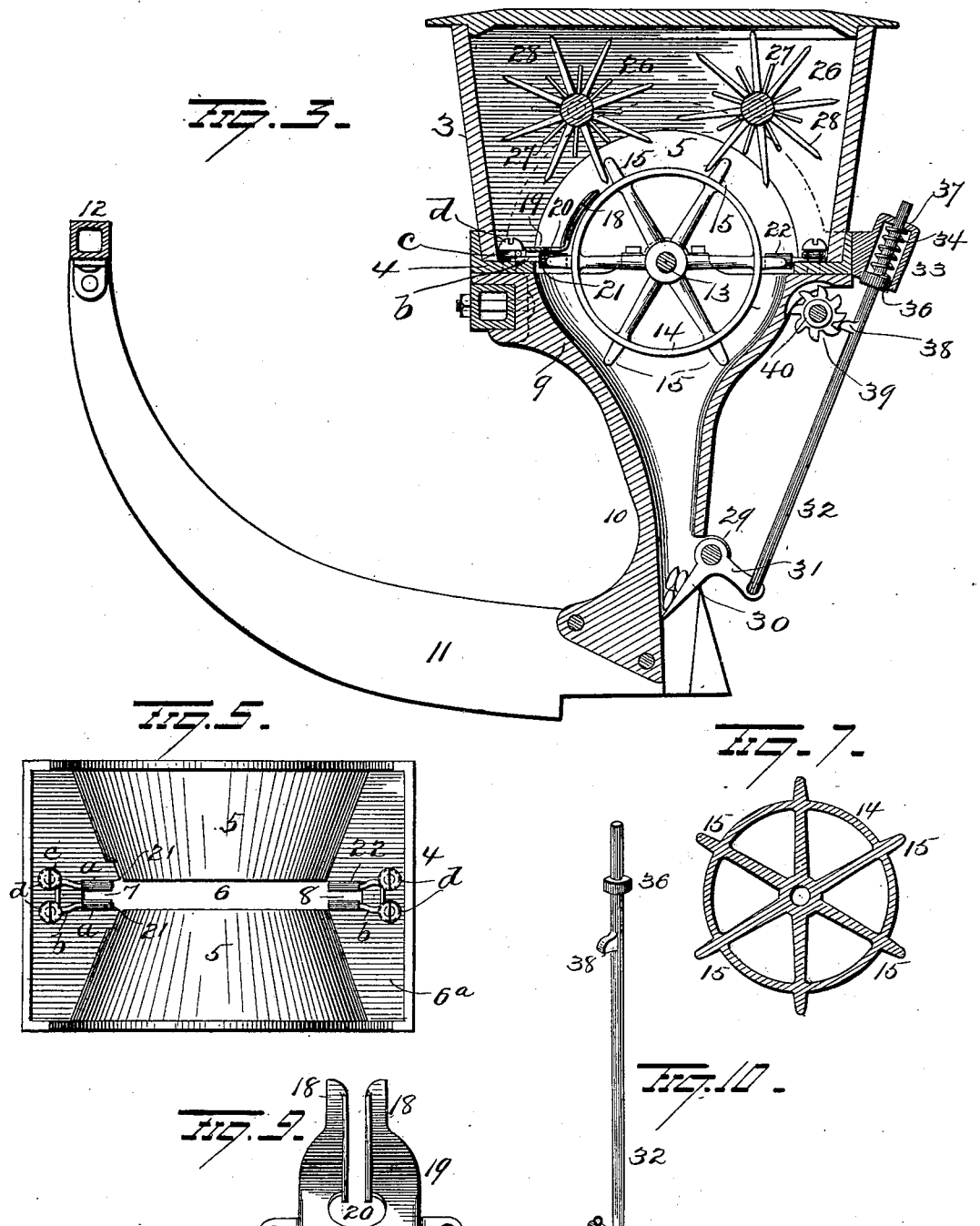

UNITED STATES PATENT OFFICE.

JOHN W. BARTLETT, OF MOLINE, ILLINOIS.

DOUBLE CHECK-ROW COTTON AND CORN PLANTER.

SPECIFICATION forming part of Letters Patent No. 631,921, dated August 29, 1899.

Application filed March 9, 1898. Serial No. 673,284. (No model.)

*To all whom it may concern:*

Be it known that I, JOHN W. BARTLETT, a citizen of the United States, residing at Moline, in the county of Rock Island and State of Illinois, have invented certain new and useful Improvements in a Combined Double Check-Row Cotton and Corn Planter; and I do hereby declare that the following is a full, clear, and exact specification.

My invention relates to an improvement in planters, and more particularly to combined double check-row cotton and corn planters, the object of the invention being to so construct a planter of the character specified that with interchangeable parts one machine will serve the purpose of planting either cotton-seed or corn with equal efficiency.

A further object is to construct the machine in such manner that two rows of cotton or corn can be simultaneously planted in checks or hills and result in a great saving of seed and the expense of cotton-chopping.

A further object is to construct the machine in such manner that the seed can be discharged rapidly with accuracy.

A further object is to produce a planter for corn and cotton-seed which shall be simple in construction and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a perspective view of a planter embodying my invention. Fig. 2 is a sectional view showing the feed devices arranged for planting corn. Fig. 3 is a similar view showing the arrangement for planting cotton-seed. Fig. 4 is a plan view of the hopper, with the cover removed, showing the same arranged for corn. Fig. 5 is a similar view showing the hopper arranged for cotton-seed. Fig. 6 is a detail view of the feed-wheel for corn, and Fig. 7 is a similar view of the feed-wheel for cotton-seed. Figs. 8, 9, 10, 11, 12, and 13 are views illustrating various details.

A represents the rectangular frame of the machine, the side bars of which are provided with suitable bearings for the revoluble shaft or axle 1, on the ends of which the ground or carrying wheels 2 are secured. To each side of the frame A, at the forward end thereof, seed boxes or hoppers 3 3 are secured.

The seedboxes and feeding devices at respective sides of the machine are the same in construction, and hence a detail description of one box and feeding mechanism will suffice for both.

The body of the box or hopper 3 may be made of wood, but the bottom 4 is preferably made of metal, and the construction of said bottom of the seedbox is an important feature of my invention. The bottom 4, which is preferably made in a single casting, is convex in side elevation, and in plan it has the appearance of two truncated cones, thus presenting two convex surfaces 5 5, inclining toward the center of the bottom and adapted to discharge seed into a slot or opening 6 in said bottom. In other words, the seedbox is provided with a convex hopper-bottom having the elongated slot or opening therein, and this slot is continued beyond the convex portions into the flat portions $6^a$ of the bottom 4, as shown at 7 and 8. The enlarged upper end 9 of the feed-boot 10 is secured to the bottom 4 of the seedbox, and to the bottom of the boot the runner 11 is secured, the forward end of the runner being attached to a cross-bar 12, secured to the main frame A. A shaft 13 is mounted near its respective ends in bearings provided at the upper ends of the boots 10, and to this shaft feed-wheels 14 are removably secured under the convex bottoms of the seedboxes. Each feed-wheel is so mounted as to be concentric with the central portion of the convex bottom 4 and closes the elongated slot or opening 6.

When the machine is to be adapted for planting cotton-seed, a feed-wheel having fingers or teeth 15 will be provided, as shown in Fig. 7; but when it is desired to plant corn a feed-wheel 16, having pockets 17, such as shown in Fig. 6, will be substituted.

When the feed-wheel 14 is revolved, the fingers 15 will force the cotton-seed down between the spring-fingers 18 of a guard 19 and into an opening 20 in said guard, which opening is located over a cut-off 21 in the outlet formed by the extension 7 of the slot or opening 6. The cut-off 21 is composed of two parallel rollers $a$ $a$, carried by spring-arms $b$. These spring-arms constitute the end of a single piece of wire, which is bent between its ends to form two coils c c—one for each arm—and through these coils screws d are passed to fasten the cut-off to the bottom 4. By thus constructing the cut-off the seed will be prevented from escaping from the seed-box except when forced out by the fingers of the feed-wheel, at which time the said cut-off will permit the passage of the fingers of the feed-wheel and the seeds without danger of injury to the latter. A similarly-constructed cut-off 22 is located at the extension 8 of slot 6.

The shaft 13 which carries the feed-wheels 14 under the convex bottoms of the respective seedboxes is provided at a point intermediate of its ends with a sprocket-wheel 23, to which motion is transmitted by a sprocket-chain 24 from a larger sprocket-wheel 25 on the revoluble shaft or axle 1.

Agitators 26 are removably mounted in each seedbox and provided with fingers 27 of varying lengths, and said agitators are also provided centrally between their ends with a series of fingers 28 of equal lengths. The agitators are so disposed that the fingers 28 thereof will project into the path of the teeth or fingers 15 of the feed-wheel 14, and thus as the feed-wheel revolves the engagement of the teeth or fingers thereof with the fingers 28 of the agitators will serve to drive the latter.

Each boot 10 is provided near its lower end with lugs or ears 29, between which a valve or gate 30 is pivotally supported and adapted to normally close the outlet of the boot and catch the seeds deposited thereinto by the feed-wheel. The valve or gate 30 is provided with an arm 31, to which the lower end of a rod 32 is pivotally connected. The upper end of the rod passes freely through a box or enlargement 33 on the rear end of the feed-box. A spring 34 is also disposed within the box or enlargement 33 and bears at its respective ends against a shoulder 36 on the rod and a shoulder 37 in the box or enlargement, said spring thus acting to maintain the valve or gate 30 normally closed and to return it to its closed position. The rod 32 is provided near its upper end with an arm or shoulder 38, adapted to be engaged by the teeth of a ratchet-wheel 39, secured to a shaft 40, mounted on the framework. The shaft 40 extends from one side to the other and is provided with a ratchet-wheel for each rod 32. The shaft 40 is also provided (at each end) with a ratchet-wheel 41, adjacent to which an arm 42 is loosely mounted on the shaft and carries a dog 43 to engage said ratchet-wheel 41.

A frame 44 is secured to the framework of the machine adjacent to the feed-box and carries guide-wheels 45 for the knotted rope usually employed with check-row planters. A forked or bifurcated arm or lever 46 (adapted to be operated by the knotted rope) is pivotally attached between its ends to the frame 44. A spring 47 is attached at its respective ends to the frame 44 and the arm or lever 46 for returning the latter to its normal position after it shall have been actuated by engagement with the knots on the rope. The inner end of the check arm or lever 46 is connected by means of a rod or pitman 48 with the arm 42.

From the construction and arrangement of parts above described it will be seen that the seed will be accurately fed from the seed-box into the boot by means of the feed-wheel, and the said feed-wheel, being mounted vertically and operating in the slot in the bottom of the convex feed-bottom, can be rotated rapidly without detracting from the accuracy of the feed. After the seed shall have been deposited into the boots it will be discharged therefrom at regular intervals by the manipulation of the valves or gates 30 through the medium of the device hereinbefore described.

The machine can be driven rapidly over a field, planting two rows of cotton-seed at a time with great accuracy, not only of the number of seeds planted at each check but also the spacing of the checks.

The machine is also well adapted for planting corn and will operate to deposit the corn with accuracy and rapidity, it being only necessary to replace the feed-wheels 14 with the feed-wheels 16, having the pockets 17, and to replace the cut-offs 21 with a cut-off 50 and a spring-finger 51 and to substitute a plate 52 for the cut-off 22.

When the machine is used for planting corn, the agitators may be removed. The cut-off 50 may consist of a pivoted arm carrying a roller 53 at one end, under which the corn passes, and under said cut-off a spring guide-finger 54 may be located to prevent the escape of the corn. The plate 52 is used to close the portion 7 of the elongated slot in the bottom of the feed-box.

My improvements are simple in construction and effectual in all respects in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a planter, the combination of a seed-box having a bottom convex on its top face and concave on its under face and projecting upwardly into the body of the box, said bottom having an elongated opening, and a vertical feed-wheel mounted under and closing said opening and having its axis approximately in line with the ends of said elongated opening.

2. In a planter, the combination of a seed-box having a bottom convex on its top face and concave on its under face and projecting upwardly within the body of the box, said bottom having a central elongated opening, the portions of said bottom at respective sides of said opening being inclined from the sides of the hopper to the opening, and a feed-wheel mounted under and concentric to said opening and having its axis approximately in line with the ends of said elongated opening.

3. In a planter, the combination of a seedbox provided with a bottom convex on its top face and concave on its under face and projecting thereinto and having a central elongated slot, a vertical feed-wheel mounted under and concentric to said slot in the bottom, and having its axis approximately in line with the ends of said slot and a spring-finger projecting partially over the elongated slot and substantially concentric thereto and to the feed-wheel.

4. In a planter, the combination of a seedbox provided with a bottom convex on its top face and concave on its under face and projecting thereinto and having an elongated slot, a feed-wheel disposed under and concentric to the elongated slot in the convex bottom and having its axis approximately in line with the ends of said elongated slot and a cut-off mounted on said convex bottom and projecting through the slot therein so as to bear against the feed-wheels.

5. In a planter, the combination of a seedbox provided with a bottom convex on its top face and concave on its under face and projecting upwardly thereinto and having a central elongated slot, a feed-wheel having its axis approximately in line with the ends of said slot, a spring-pressed cut-off supported by said bottom and projecting through the slot therein some distance from one end of said slot, said cut-off adapted to bear against the periphery of the feed-wheel, and a spring guide-finger over the portion of the elongated slot in the convex bottom, under and in rear of the cut-off.

6. In a double check-row planter, the combination with framework, of two seedboxes each having a slotted bottom, projecting upwardly thereinto convex on the top face and concave on the under face and a transverse shaft, vertically-disposed feed-wheels, one for each seedbox, secured to said shaft and disposed concentric with the bottom and under the slots therein, the axis of the feed-wheels being approximately in line with the ends of the slots in the hopper-bottoms and means for driving said shaft, substantially as set forth.

7. In a planter, the combination with a seedbox having a slotted bottom convex on the top face and concave on the under face and a boot, of a vertically-disposed feed-wheel under and concentric with said slotted bottom and directly over the boot, said feed-wheel adapted to rotate within the upper part of the boot and having its axis approximately in line with the ends of the slot in the hopper-bottom, a valve or gate in the boot and means for opening and closing said valve or gate at intervals.

8. In a planter, the combination with a seedbox and a feed-wheel, of a cut-off consisting of a single piece of spring wire bent to form two coils and arms projecting from said coils rollers mounted on said arms and a fastening device passing through each coil, substantially as set forth.

9. In a planter, the combination with a seedbox, a feed-wheel and a boot, of a hinged valve or gate in said boot, a hollow enlargement on the feed-box, a longitudinally-movable rod passing through said enlargement and connected with said valve or gate, a spring within said hollow enlargement and bearing at its respective ends against shoulders in said enlargement and on said rod, whereby to retain said valve or gate closed and means for raising said rod to open the valve or gate at intervals.

10. In a planter, the combination with a seedbox, a boot and means for feeding seed from the box to the boot, of a valve or gate in the boot, a spring-actuated rod connected with said valve or gate and having a shoulder, a shaft mounted on the frame of the machine, a ratchet-wheel secured to said shaft and adapted to engage the shoulder on said rod, an arm mounted loosely on the shaft, a second ratchet-wheel on the shaft, a dog carried by said arm to engage said last-mentioned ratchet-wheel, a check-lever and a connection between said check-lever and arm, substantially as set forth.

11. In a planter, the combination with a seedbox having a convex slotted bottom, of a feed-wheel mounted under said bottom, horizontally-disposed rotary agitators in the seedbox and having arms adapted to be engaged by the feed-wheel to rotate said agitators.

12. In a planter, the combination with a seedbox having a convex slotted bottom, of a feed-wheel mounted under said bottom, fingers on said feed-wheel projecting through the slot in the convex bottom and adapted to feed seed from the seedbox and agitators mounted in the seedbox and having fingers adapted to project into the path of the fingers on the feed-wheel, whereby said agitators will be driven by the feed-wheel, substantially as set forth.

13. In a planter, the combination with a seedbox having a slotted bottom and a feed-wheel, of a guard having fingers disposed parallel with the slot in the hopper and having an enlarged opening at the juncture of said fingers with the body of the guard and over the outlet of the hopper, substantially as set forth.

In testimony whereof I affix my signature in presence of two witnesses.

JOHN W. BARTLETT.

Witnesses:
 D. J. WEBB,
 S. SWARTZENBURG.